(12) United States Patent
Happel

(10) Patent No.: US 6,270,663 B1
(45) Date of Patent: Aug. 7, 2001

(54) STORM DRAIN FILTER SYSTEM

(76) Inventor: Henry Happel, 140 Ruby St., Rockledge, FL (US) 32955

( * ) Notice: Subject to any disclaimer, the term of this patent is extended or adjusted under 35 U.S.C. 154(b) by 0 days.

(21) Appl. No.: 09/618,587

(22) Filed: Jul. 17, 2000

(51) Int. Cl.[7] .............................. E03F 5/16; E03F 5/14; C02F 1/28; C02F 9/00; B01D 35/02
(52) U.S. Cl. ...................... 210/163; 210/170; 210/266; 210/282; 210/474
(58) Field of Search .................................. 210/163, 282, 210/266, 170, 474; 404/4

(56) References Cited

U.S. PATENT DOCUMENTS

| | | |
|---|---|---|
| 5,192,156 | 3/1993 | Webb . |
| 5,284,580 | 2/1994 | Shyh . |
| 5,575,925 | 11/1996 | Logue, Jr. . |
| 5,632,889 | 5/1997 | Tharp . |
| 5,643,445 | 7/1997 | Billias et al. . |
| 5,650,065 | 7/1997 | Sewell . |

*Primary Examiner*—Thomas M. Lithgow
(74) *Attorney, Agent, or Firm*—William M. Hobby, III

(57) ABSTRACT

A storm sewer filter apparatus for filtering liquid runoff has a liquid capturing container shaped to fit into a storm sewer drain opening and has an elongated trough forming a periphery around the liquid capturing container adjacent the storm sewer drain opening. One or more oil filtering booms are positioned in the liquid capturing container elongated trough for removing oil from the liquid entering the storm sewer. The liquid capturing container has a plurality of fine screen outlets therefrom in the bottom and bottom portion sides and a plurality of coarse screens, coarser than the bottom fine screens, located in the middle portion of the liquid capturing container. A plurality of overflow openings are located in the upper portion of the liquid capturing container so that oil in the liquid runoff entering the storm sewer drain opening is captured and removed in the trough with the oil filtering boom and debris and solids are captured in said container to allow filtered water to enter the storm drain pipe. A liquid turbulence shield is attached to the sides of said liquid capturing container below said elongated trough.

11 Claims, 2 Drawing Sheets

STORM DRAIN FILTER SYSTEM

BACKGROUND OF THE INVENTION

This application relates to a storm drain filter system which is placed beneath the grate of the entrance to a storm water catch basin and especially to a filter system which collects the entering storm water and filters out hydrocarbons, such as automobile oil, sand and debris, such as grass clippings, from the storm water to provide a much cleaner water to a storm drain pipe.

Ground water from heavy rains or melted snow is collected in storm sewer catch basins and flows into an underground storm drain or sewer line. The water flows into the basin through openings in a grate placed on top of the basin to prevent larger solids from entering the basin. Conventional storm sewer filters remove solids from the water before the water flows into the catch basin. These filters are sometimes made of a porous material and located at or above grade level. Filters may be placed horizontally on top of the grate or may be positioned vertically in a circle above grade level surrounding the grate. Water flows through the filter and into the catch basin while solids are captured by the filter. Over time, the solids build up on the filter and impede the free-flow of water through the filter and the collected water floods the area surrounding the storm sewer. Conventional ground storm sewer filters located at or above grade level are readily visible.

One prior art U.S. patent for a storm sewer filter can be seen in the Logue, Jr. U.S. Pat. No. 5,575,925, for a storm sewer catch basin and filter having a removable filter for buried catch basins. The filter includes a bag located below grade level in the catch basin and looped flaps which extend above grade level to aid in the removal of the filter from the catch basin. The filter is held in place in the basin by a heavy grate which rests on top of the flaps. In the Webb U.S. Pat. No. 5,192,156, a drain apparatus for a liquid trap is provided for placement in the opening for catching a runoff liquid from a surface into a sewer through a passageway extending between the surface and the sewer and for forming a liquid barrier between the sewer and the surface to prevent the flow of gases from the sewer to the surface. The Shyh U.S. Pat. No. 5,284,580, is a refuge collecting frame for a drainage sewer which is placed beneath a cover of a sewer drainage opening to accumulate refuge and permit easy disposable of the refuge accumulated therein to prevent blockage of the sewer. The frame body is a rectangular frame structure having dimensions corresponding to the opening of a sewer drain and has a filtering net or porous board with a plurality of holes therein incorporated into each side and bottom of the frame. The Tharp U.S. Pat. No. 5,632,889, is a filter cartridge for separating liquid hydrocarbons from water. A cartridge is formed from perlite particles which have been expanded and treated. The cartridge is mounted and removed from a catch basin opening. The Sewell U.S. Pat. No. 5,650,065, is a skimmer cover for a dry well in a catch basin for placing in an opening in a storm water catch basin to prevent floatable materials, such as hydrocarbons from a motor vehicle, from entering the catch basin. The Billias et al. U.S. Pat. No. 5,643,445, is a removable storm water screen and overflow device which includes a debris removing screen basket and overflow apparatus for use in a storm collection sewer and includes a central panel with foldable wings in each side of the central panel and in which each wing can have an optional extension panel slidably attached to each wing by bolts and nuts through longitudinal slots.

In contrast, the present invention is directed towards a storm drain filter system which is placed beneath the grate of the entrance to a storm water catch basin and especially to a filter system which collects the entering storm water and filters out hydrocarbons, such as automobile oil, sand and debris, such as grass clippings, from the storm water to provide a much cleaner water to the storm pipe by passing the drainage water onto an oil filter boom and then into a container having fine screen filtered outlets in the bottom and coarser screen filters on the sides and having overflow openings near the top of the container.

SUMMARY OF THE INVENTION

A storm sewer filter apparatus for filtering liquid runoff has a liquid capturing container shaped to fit into a storm sewer drain opening and has an elongated trough forming a periphery around the liquid capturing container adjacent the storm sewer drain opening. One or more oil filtering booms are positioned in the liquid capturing container elongated trough for removing oil from the liquid entering the storm sewer. The liquid capturing container has a plurality of fine screen outlets therefrom in the bottom and bottom portion sides and a plurality of coarse screens, coarser than the bottom fine screens, located in the middle portion of the liquid capturing container. A plurality of overflow openings are located in the upper portion of the liquid capturing container so that oil in the liquid runoff entering the storm sewer drain opening is captured and removed in the trough with the oil filtering boom and debris and solids are captured in said container to allow filtered water to enter the storm drain pipe. A liquid turbulence shield is attached to the sides of said liquid capturing container below said elongated trough.

BRIEF DESCRIPTION OF THE DRAWINGS

Other objects, features, and advantages of the present invention will be apparent from the written description and the drawings in which.

DETAILED DESCRIPTION

Figure 1:
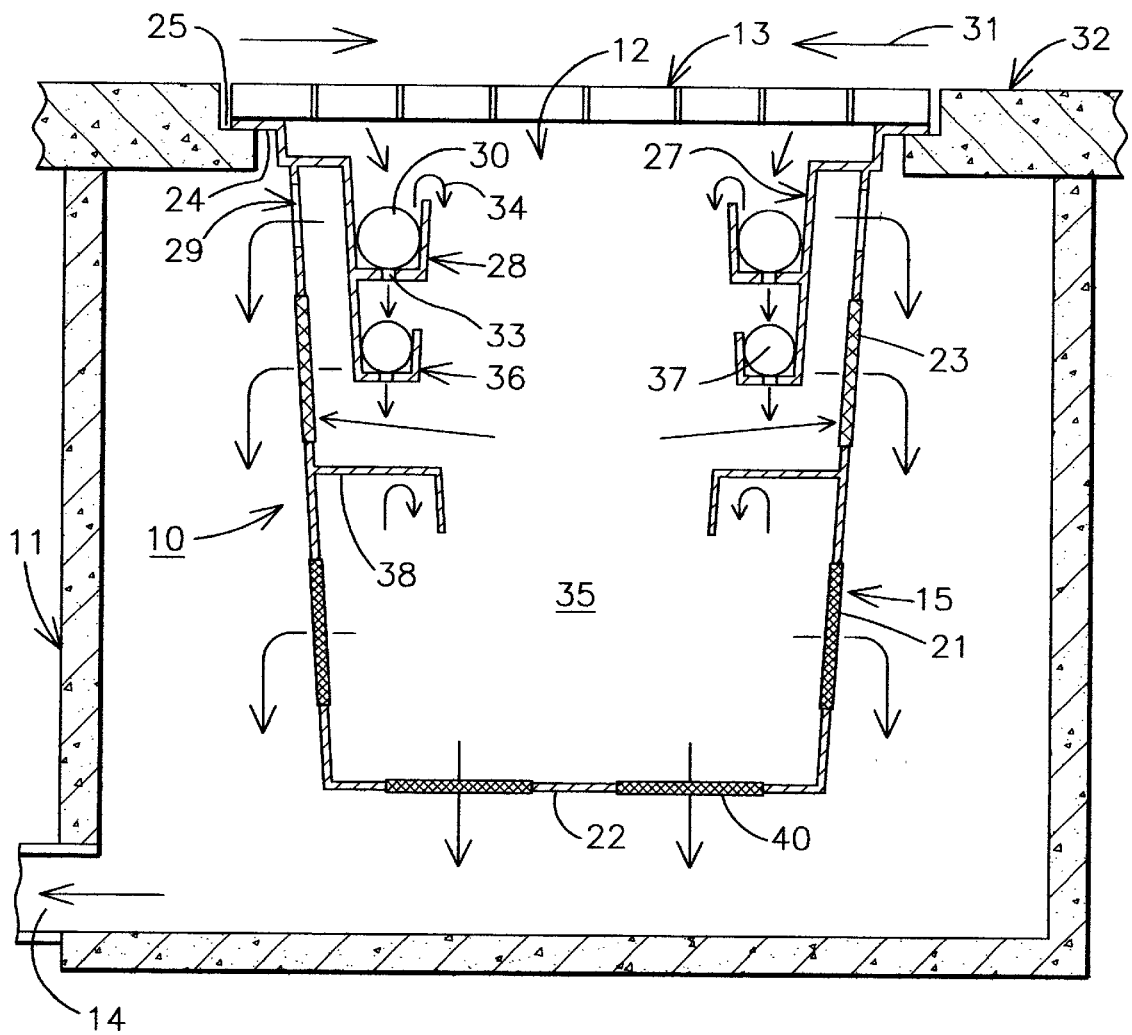
FIG. 1 is a sectional view taken through a storm drain inlet filter system in accordance with the present invention mounted under the grate of a storm water drain inlet.
Figures 3, 4:
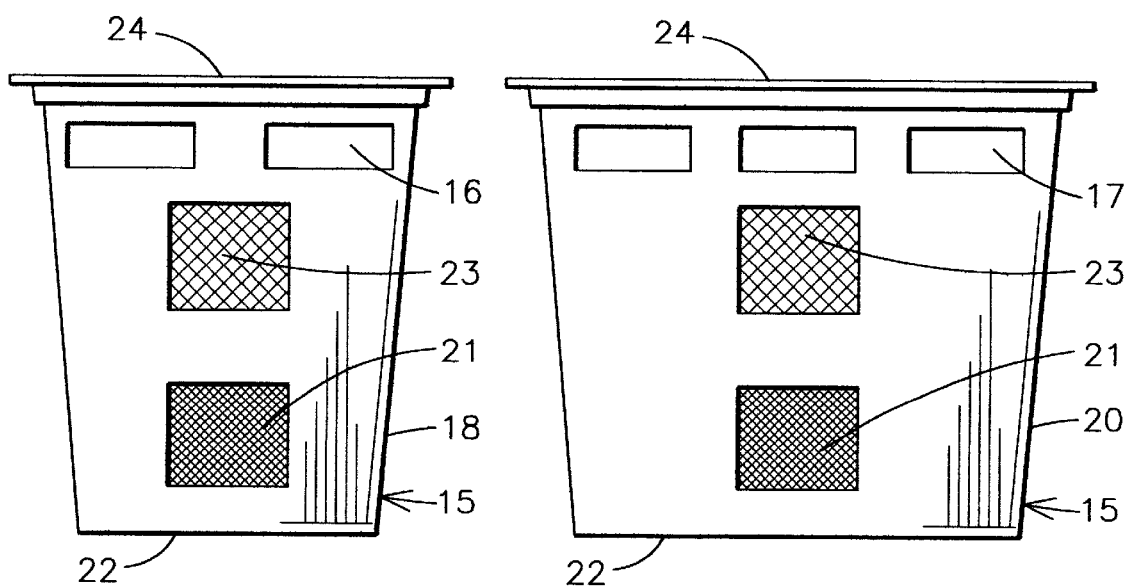
FIG. 3 is an end elevation of the basic filter box.
FIG. 4 is a side elevation of the basic filter box.
Figure 2:
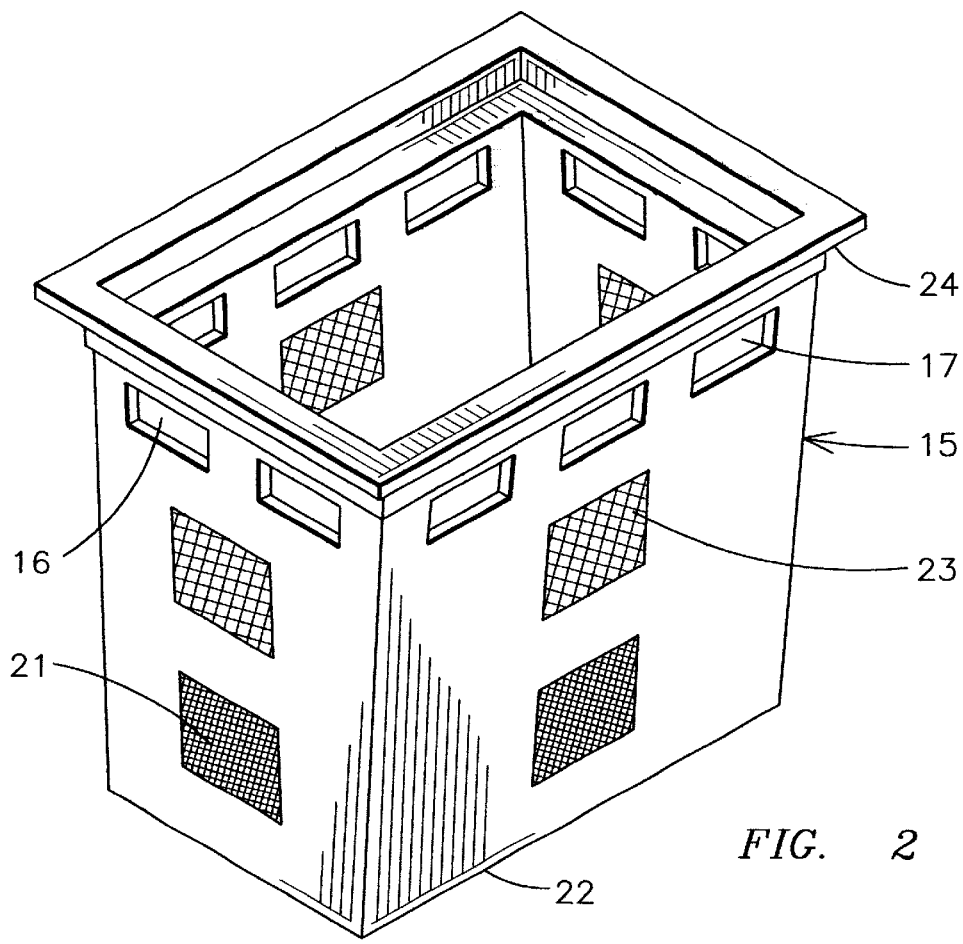
FIG. 2 is a perspective view of the basic filter box.
Figure 5:
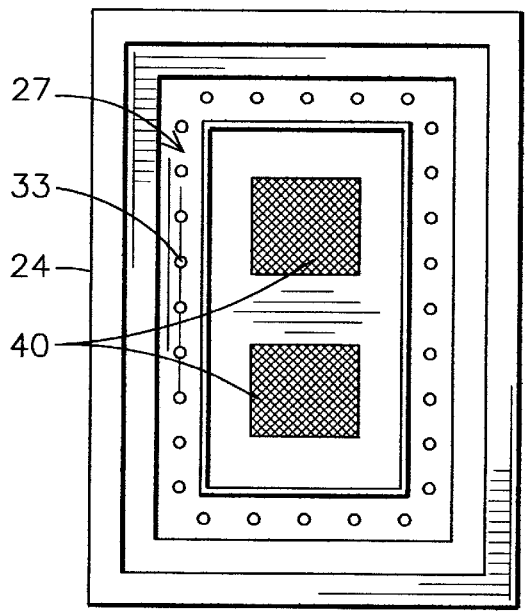
FIG. 5 is a top plan view of the basic filter box with the hydrocarbon filters removed.
Figure 6:
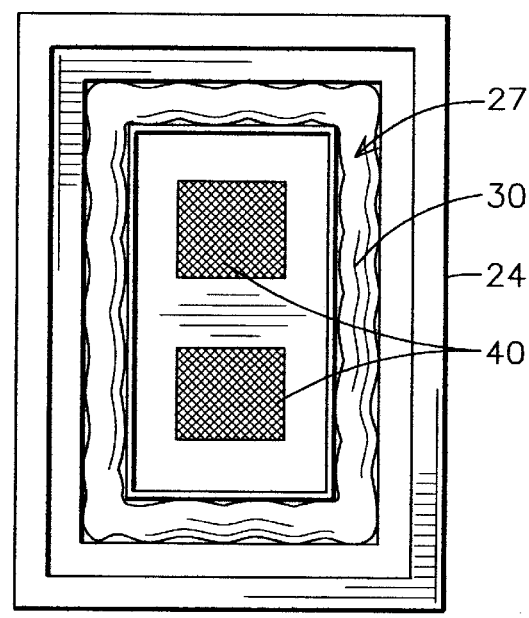
FIG. 6 is a top plan view of the storm drain filter of FIGS. 1–5.

Referring to FIG. 1 of the drawing, a storm water drain inlet filter system 10 is mounted in a storm water drain collection basin inlet 11 having the opening 12 and a cover grate 13. The concrete catch basin 11 has a storm pipe outlet 14. The filter system 10 has a basic filter box 15, as more clearly seen in FIGS. 2, 3 and 4. The filter box 15 is generally of a rectangular shape having rectangular outlet openings 16 in each end of the box 15 near the top of the box and has a plurality of rectangular openings 17 in the side 18 of the box 15. The filter box 15 can be alternatively of a rounded shape. The filter box 15 end 20 also has a fine screen filter 21 mounted near the bottom 22 of the filter box 15 while the side 18 has a screen filter 23 of a coarser screen for filtering coarser materials and mounted between the bottom 22 and the top 24 of the filter box. The surrounding flange 24 allows the filter box 15 to ride on a ledge 25 which supports the edge of the grate 13 but mounted under the grate 13, as seen in FIGS. 1, 5 and 6.

The filter box 15 has a skimmer tray 27 therein having a first filter supporting gutter 28 having a hydrocarbon filter 30 mounted therein and surrounding the edge of the filter box 15 so that storm water 31 entering from a parking lot surface 32 will flow through the grate 13, along the edges and into the gutter 28 where it will pass through the hydrocarbon or oil filter 30. The gutter 28 has a plurality of openings 33 in the bottom thereof, as seen in FIG. 5. The storm water entering the gutter portion 28 can also overflow, as seen by the arrows 34, so that the water can fall into the main filter box chamber 35. The water passing through the openings 33 of the gutter 28 fall into a second stage filtering gutter 36 having a second stage filter 37 therearound for filtering water of hydrocarbons and the like for a second time. Water can also overflow over the edges of the gutter edge 36. It will be clear that only one filter gutter can be utilized if desired without departing from the spirit and scope of the invention.

The filter box 15 has a surrounding water turbulence deflection shield 38 so that the water can flow into the chamber 35 and the shields 38 to prevent the turbulence from flowing up and dispersing finer particles collected into the bottom of the chamber 35. The bottom of the filter box 15 can have one or more screen filters 40 of a small sieve size for capturing sand and smaller pollutants which can pass through the screen or the similar side screens 21. As the filter box 15 fills with storm water, the water will rise and allow the overflow through the larger sieve size screens 23 placed higher up in the filter box 15. If the water continues to rise, then the water can overflow the large unfiltered openings 27. However, at this point, the sand and heavier elements have been collected in the bottom of the filter box 15 while the water turbulent deflection shields 38 have prevented floating materials from exiting the overflow 27. This captures cut grass particles and the like.

In operation, the storm water 31 run off from the parking lot 32 passes through the grate 13 and into the skimmer trays 28 which can absorb oil and hydrocarbon runoff while allowing the water to pass through the hydrocarbon filters 30, through the openings 33, and to overflow the edges of the skimmer tray 28. Water passing through the skimmer tray 28 openings 33 falls into the skimmer tray 36 where a second filter boom removes any remaining hydrocarbon and the water is then deposited within the filter box 15 chamber 35 where it runs out of the bottom 22 through the small sieve screens 40 or side small screen sieves 21. Fast flowing water can push floatable material back up but the water turbulence deflection shields 38 prevent the splashing and pushing of the materials upwards within the filter box 15. As the box fills, the larger sieve screen filters 23 allow for a high volume flow while capturing larger trash and floatables. As the large inflow fills the filter box 15, the overflow can pass through the large side openings 27 and into the concrete catch basin 11 passing cleaner water into the storm pipe outlet 14. The booms 30 and 37 can be removed and replaced when they become fully saturated with oils or hydrocarbons and can be either a throw-away type filter or one that can be processed and reused.

It should be clear at this time that a storm water catch basin filter system has been provided which attaches to the grate inlet of the catch basin for removing solids, organic contaminants, such as grass clippings and leaves, and hydrocarbon materials, such as oil, collected from vehicles parked in a parking lot. However, the present invention is not limited to the forms shown which are illustrative rather than restrictive.

I claim:

1. A storm sewer filter apparatus for filtering liquid runoff comprising:
   a liquid capturing container shaped to fit into a storm sewer drain opening and having a bottom and a plurality of sides, said liquid capturing container having a bottom portion, a middle portion and a top portion and having an elongated trough having interior and exterior walls and forming a periphery around a storm sewer drain opening;
   an oil filtering boom located in said liquid capturing container elongated trough for removing oil from said liquid entering said storm sewer; and
   said liquid capturing container having a plurality of fine screen outlets therefrom in said bottom portion thereof and a plurality of coarse screens, coarser than said fine screens, and located in said middle portion thereof and a plurality of overflow openings in said upper portion of said liquid capturing container whereby oil in liquid runoff entering said storm sewer drain opening is captured and removed in said trough with said oil filtering boom and debris and solids are captured in said container.

2. A storm sewer filter apparatus in accordance with claim 1 in which said liquid capturing container has a flange therearound for supporting said container in a storm drain opening on the edges of said storm drain opening.

3. A storm sewer filter apparatus in accordance with claim 2 in which said storm drain container elongated trough has a plurality of drainage apertures therethrough to allow the drainage of filtered liquid therefrom.

4. A storm sewer filter apparatus in accordance with claim 3 in which said liquid capturing container has a liquid turbulence shield attached to the sides thereof below said elongated trough.

5. A storm sewer filter apparatus in accordance with claim 4 in which said liquid turbulence shield has a downwardly facing L-shaped cross section.

6. A storm sewer filter apparatus in accordance with claim 4 in which each said elongated trough has a second elongated trough having interior and exterior walls and forming a periphery around a storm sewer drain opening directly below said elongated trough, said second elongated trough having a second oil filtering boom therein.

7. A storm sewer filter apparatus in accordance with claim 5 in which said liquid capturing container bottom has at least one of said plurality of fine screen outlets therein and said bottom portion sides has at least one of said plurality of fine screen outlets therein.

8. A storm sewer filter apparatus in accordance with claim 7 in which said liquid capturing container liquid turbulence shield is positioned between said bottom portion fine screens and said middle portion coarse screens.

9. A storm sewer filter apparatus in accordance with claim 8 in which two double filter elements are positioned in each trough section.

10. A storm sewer filter apparatus in accordance with claim 9 in which each said elongated trough has a rear wall spaced from said upper portion sides and extending over said overflow opening therein.

11. A storm sewer filter apparatus in accordance with claim 10 in which said elongated trough has an interior wall and an exterior wall and said interior wall being lower than said exterior wall to allow overflow from said elongated trough into said liquid collection container bottom portion.

\* \* \* \* \*